United States Patent
Hochrein et al.

(10) Patent No.: US 9,499,200 B2
(45) Date of Patent: Nov. 22, 2016

(54) TRAILER BACKUP ASSIST SYSTEM WITH OBJECT DETECTION

(71) Applicant: Ford Global Technologies, LLC, Dearborn, MI (US)

(72) Inventors: Bradley G. Hochrein, Dexter, MI (US); Nathaniel Abram Rolfes, Oak Park, MI (US); Donald Jacob Mattern, Canton, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/669,130

(22) Filed: Mar. 26, 2015

(65) Prior Publication Data

US 2015/0197282 A1 Jul. 16, 2015

Related U.S. Application Data

(63) Continuation-in-part of application No. 13/759,022, filed on Feb. 4, 2013, now Pat. No. 9,164,955.

(51) Int. Cl.

| | |
|---|---|
| *B62D 6/00* | (2006.01) |
| *B62D 13/06* | (2006.01) |
| *B60T 7/20* | (2006.01) |
| *B62D 15/02* | (2006.01) |

(Continued)

(52) U.S. Cl.
CPC .......... *B62D 13/06* (2013.01); *B60T 7/20* (2013.01); *B60T 8/1708* (2013.01); *B62D 15/027* (2013.01); *B62D 15/0285* (2013.01); *G05D 1/0223* (2013.01); *B60T 2201/022* (2013.01); *B60T 2201/10* (2013.01); *B60T 2230/08* (2013.01)

(58) Field of Classification Search
CPC  B62D 13/06; B62D 15/0285; B62D 15/027; B60T 8/1708; B60T 7/20; B60T 2230/08; B60T 2201/022; B60T 2201/10; G05D 1/0223

See application file for complete search history.

(56) References Cited

U.S. PATENT DOCUMENTS 3,542,390 A 11/1970 Fikse
3,756,624 A * 9/1973 Taylor ...................... B60D 1/06
                                                280/423.1

(Continued)

FOREIGN PATENT DOCUMENTS

CN    202159367 U    3/2012
DE    3931518 A1     4/1991

(Continued)

OTHER PUBLICATIONS

Haviland, G S, "Automatic Brake Control for Trucks—What Good Is It?", TRID, Society of Automotive Engineers, Sep. 1968, 1 pg.

(Continued)

*Primary Examiner* — Mary Cheung
(74) *Attorney, Agent, or Firm* — Raymond Coppiellie; Price Heneveld LLP

(57) ABSTRACT

A system for backing a vehicle and a trailer is provided herein. A sensing system is configured to detect objects located in an operating environment of the vehicle and trailer. A backup assist system is configured to communicate with the sensing system and automatically control a braking system of the vehicle to slow or stop the vehicle during a backing maneuver.

15 Claims, 5 Drawing Sheets

(51) Int. Cl.
    *G05D 1/02* (2006.01)
    *B60T 8/17* (2006.01)

(56) References Cited

U.S. PATENT DOCUMENTS

| | | |
|---|---|---|
| 3,860,257 A | 1/1975 | Mesly |
| 4,042,132 A | 8/1977 | Bohman et al. |
| 4,735,432 A | 4/1988 | Brown |
| 4,752,080 A | 6/1988 | Rogers |
| 4,848,499 A | 7/1989 | Martinet et al. |
| 5,001,639 A | 3/1991 | Breen |
| 5,108,158 A | 4/1992 | Breen |
| 5,246,242 A | 9/1993 | Penzotti |
| 5,247,442 A | 9/1993 | Kendall |
| 5,558,350 A | 9/1996 | Kimbrough et al. |
| 5,586,814 A | 12/1996 | Steiner |
| 6,042,196 A | 3/2000 | Nakamura et al. |
| 6,056,371 A | 5/2000 | Lin et al. |
| 6,292,094 B1 | 9/2001 | Deng et al. |
| 6,351,698 B1 | 2/2002 | Kubota et al. |
| 6,409,288 B2 | 6/2002 | Yoshida et al. |
| 6,494,476 B2 | 12/2002 | Masters et al. |
| 6,498,977 B2 | 12/2002 | Wetzel et al. |
| 6,567,731 B2 | 5/2003 | Chandy |
| 6,838,979 B2 | 1/2005 | Deng et al. |
| 7,032,705 B2 | 4/2006 | Zheng et al. |
| 7,117,077 B2 | 10/2006 | Michi et al. |
| 7,136,754 B2 | 11/2006 | Hahn et al. |
| 7,139,650 B2 | 11/2006 | Lubischer |
| 7,154,385 B2 | 12/2006 | Lee et al. |
| 7,165,820 B2 | 1/2007 | Rudd, III |
| 7,219,913 B2 | 5/2007 | Atley |
| 7,319,927 B1 | 1/2008 | Sun et al. |
| 7,690,737 B2 | 4/2010 | Lu |
| 7,793,965 B2 | 9/2010 | Padula |
| 7,969,326 B2 | 6/2011 | Sakakibara |
| 8,010,253 B2 | 8/2011 | Lundquist |
| 8,033,955 B2 | 10/2011 | Farnsworth |
| 8,036,792 B2 | 10/2011 | Dechamp |
| 8,108,116 B2 | 1/2012 | Mori et al. |
| 8,170,726 B2 | 5/2012 | Chen et al. |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,374,749 B2 | 2/2013 | Tanaka |
| 8,430,792 B2 | 4/2013 | Noll |
| 8,469,125 B2 | 6/2013 | Yu et al. |
| 8,571,758 B2 | 10/2013 | Klier et al. |
| 8,755,982 B2 | 6/2014 | Heckel et al. |
| 8,755,984 B2 | 6/2014 | Rupp et al. |
| 8,798,860 B2 | 8/2014 | Dechamp |
| 8,825,328 B2* | 9/2014 | Rupp ................ B62D 13/06 303/123 |
| 8,909,426 B2 | 12/2014 | Rhode et al. |
| 8,930,140 B2 | 1/2015 | Trombley et al. |
| 9,102,271 B2 | 8/2015 | Trombley et al. |
| 9,108,598 B2 | 8/2015 | Headley |
| 9,132,856 B2 | 9/2015 | Shepard |
| 9,180,890 B2 | 11/2015 | Lu et al. |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 2001/0037164 A1 | 11/2001 | Hecker |
| 2001/0052434 A1* | 12/2001 | Ehrlich ................ B60Q 1/22 180/169 |
| 2005/0146607 A1* | 7/2005 | Linn ................ B60R 1/00 348/148 |
| 2005/0168331 A1* | 8/2005 | Gunderson ............ B60Q 1/525 340/468 |
| 2005/0206225 A1 | 9/2005 | Offerle et al. |
| 2005/0236201 A1 | 10/2005 | Spannheimer et al. |
| 2005/0236896 A1 | 10/2005 | Offerle et al. |
| 2006/0103511 A1 | 5/2006 | Lee et al. |
| 2006/0142936 A1 | 6/2006 | Dix |
| 2007/0027581 A1 | 2/2007 | Bauer et al. |
| 2007/0198190 A1 | 8/2007 | Bauer et al. |
| 2008/0177443 A1 | 7/2008 | Lee et al. |
| 2009/0082935 A1 | 3/2009 | Leschuk et al. |
| 2009/0157260 A1 | 6/2009 | Lee |
| 2009/0198425 A1 | 8/2009 | Englert |
| 2009/0271078 A1 | 10/2009 | Dickinson |
| 2009/0306854 A1 | 12/2009 | Dechamp |
| 2009/0306861 A1 | 12/2009 | Schumann et al. |
| 2009/0326775 A1 | 12/2009 | Nishida |
| 2010/0152989 A1 | 6/2010 | Smith et al. |
| 2011/0087398 A1 | 4/2011 | Lu et al. |
| 2012/0041658 A1 | 2/2012 | Turner |
| 2012/0095649 A1 | 4/2012 | Klier et al. |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1* | 10/2012 | Rhode .................. B62D 1/22 701/42 |
| 2012/0271522 A1 | 10/2012 | Rupp et al. |
| 2012/0283909 A1 | 11/2012 | Dix |
| 2012/0310594 A1 | 12/2012 | Watanabe |
| 2012/0316732 A1 | 12/2012 | Auer |
| 2013/0024064 A1* | 1/2013 | Shepard ................ B62D 13/06 701/23 |
| 2013/0148748 A1 | 6/2013 | Suda |
| 2013/0179038 A1 | 7/2013 | Goswami et al. |
| 2013/0268160 A1 | 10/2013 | Trombley et al. |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0121930 A1 | 5/2014 | Allexi et al. |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0379217 A1 | 12/2014 | Rupp et al. |
| 2015/0025732 A1 | 1/2015 | Min et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2015/0232092 A1 | 8/2015 | Fairgrieve et al. |
| 2016/0009288 A1 | 1/2016 | Yu |
| 2016/0052548 A1 | 2/2016 | Singh et al. |

FOREIGN PATENT DOCUMENTS

| | | |
|---|---|---|
| DE | 9208595 U1 | 8/1992 |
| DE | 10154612 A1 | 5/2003 |
| DE | 102005043466 A1 | 3/2007 |
| DE | 102005043467 A1 | 3/2007 |

(56) References Cited

FOREIGN PATENT DOCUMENTS

| | | |
|---|---|---|
| DE | 102005043468 A1 | 3/2007 |
| DE | 102006002294 A1 | 7/2007 |
| DE | 102007029413 A1 | 1/2009 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102010029184 A1 | 11/2011 |
| EP | 0418653 A1 | 3/1991 |
| EP | 1361543 A2 | 11/2003 |
| EP | 1655191 A1 | 5/2006 |
| EP | 1810913 A1 | 7/2007 |
| EP | 2388180 A2 | 11/2011 |
| EP | 2644477 A1 | 10/2013 |
| FR | 2515379 A1 | 4/1983 |
| JP | 09267762 A | 10/1997 |
| JP | 10119739 A | 5/1998 |
| JP | 2012166580 A | 9/2012 |
| WO | 0044605 A1 | 8/2000 |
| WO | 2012059207 A1 | 5/2012 |
| WO | 2012103193 A1 | 8/2012 |
| WO | 2013186208 A2 | 12/2013 |

OTHER PUBLICATIONS

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.
Divelbiss, A.W.; Wen, J.T.; "Trajectory Tracking Control of a Car-Trailer System", IEEE, Control Systems Technology, Aug. 6, 2002, vol. 5, No. 3, 1 pg.
Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.
"Understanding Tractor-Trailer Performance", Caterpillar, 2006, pp. 1-28.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, pp. 1-8.
Olof Enqvist, "AFS-Assisted Trailer Reversing," Institutionen för systemteknik Deartment of Electrical Engineering, Jan. 27, 2006, 57 pgs.
Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.
Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.
Zhe Leng; Minor., M., "A Simple Tractor-Trailer Backing Control Law for Path Following", IEEE, Intelligent Robots and Systems (IROS) IEEE/RSJ International Conference, Oct. 2010, 2 pgs.
"2012 Edge—Trailer Towing Selector", Brochure, Preliminary 2012 RV & Trailer Towing Guide Information, 2011, 3 pgs.
"Ford Super Duty: Truck Technologies", Brochure, Sep. 2011, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 1 pg.
Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.
"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.
Micah Steele, R. Brent Gillespie, "Shared Control Between Human and Machine: Using a Haptic Steering Wheel to Aid in Land Vehicle Guidance", University of Michigan, Date Unknown, 5 pgs.
Sh. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.
F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.
M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

\* cited by examiner

TRAILER BACKUP ASSIST SYSTEM WITH OBJECT DETECTION

CROSS-REFERENCE TO RELATED APPLICATIONS

This patent application is continuation-in-part of U.S. patent application Ser. No. 13/759,022 which was filed on Feb. 4, 2013, entitled "TRAILER ACTIVE BACK-UP ASSIST WITH OBJECT AVOIDANCE," which is hereby incorporated by reference in entirety.

FIELD OF THE INVENTION

The present invention generally relates to trailer backup assist systems, and more particularly, to a system and method for backing a trailer with object detection.

BACKGROUND OF THE INVENTION

Backing a vehicle with an attached trailer can be very challenging for many drivers. While a backing maneuver is being executed, the driver may have difficulty keeping track of possible objects in the environment in which the vehicle and trailer are operating. As such, there is a need for a system having object detection capabilities to reduce potential collisions involving the vehicle, trailer, and other objects in the operating environment.

SUMMARY OF THE INVENTION

According to one aspect of the present invention, a system for backing a vehicle and a trailer is provided. A sensing system is configured to detect objects in an operating environment of the vehicle and trailer. A backup assist system is configured to receive information from the sensing system and automatically modify a speed of the vehicle to prevent the vehicle or trailer from colliding with a detected object during a backing maneuver.

According to another aspect of the present invention, a method for backing a vehicle and trailer is provided. The method includes the steps of: executing a backing maneuver of the vehicle and trailer; detecting objects in an operating environment of the vehicle and trailer; and automatically controlling a braking system of the vehicle to modify a speed of the vehicle during the backing maneuver.

According to yet another aspect of the present invention, a method for backing a vehicle and trailer is provided. The method includes the steps of: executing a backing maneuver of the vehicle and trailer; detecting objects in an operating environment of the vehicle and trailer; and automatically controlling a braking system of the vehicle to modify a speed of the vehicle during the backing maneuver.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein.

However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
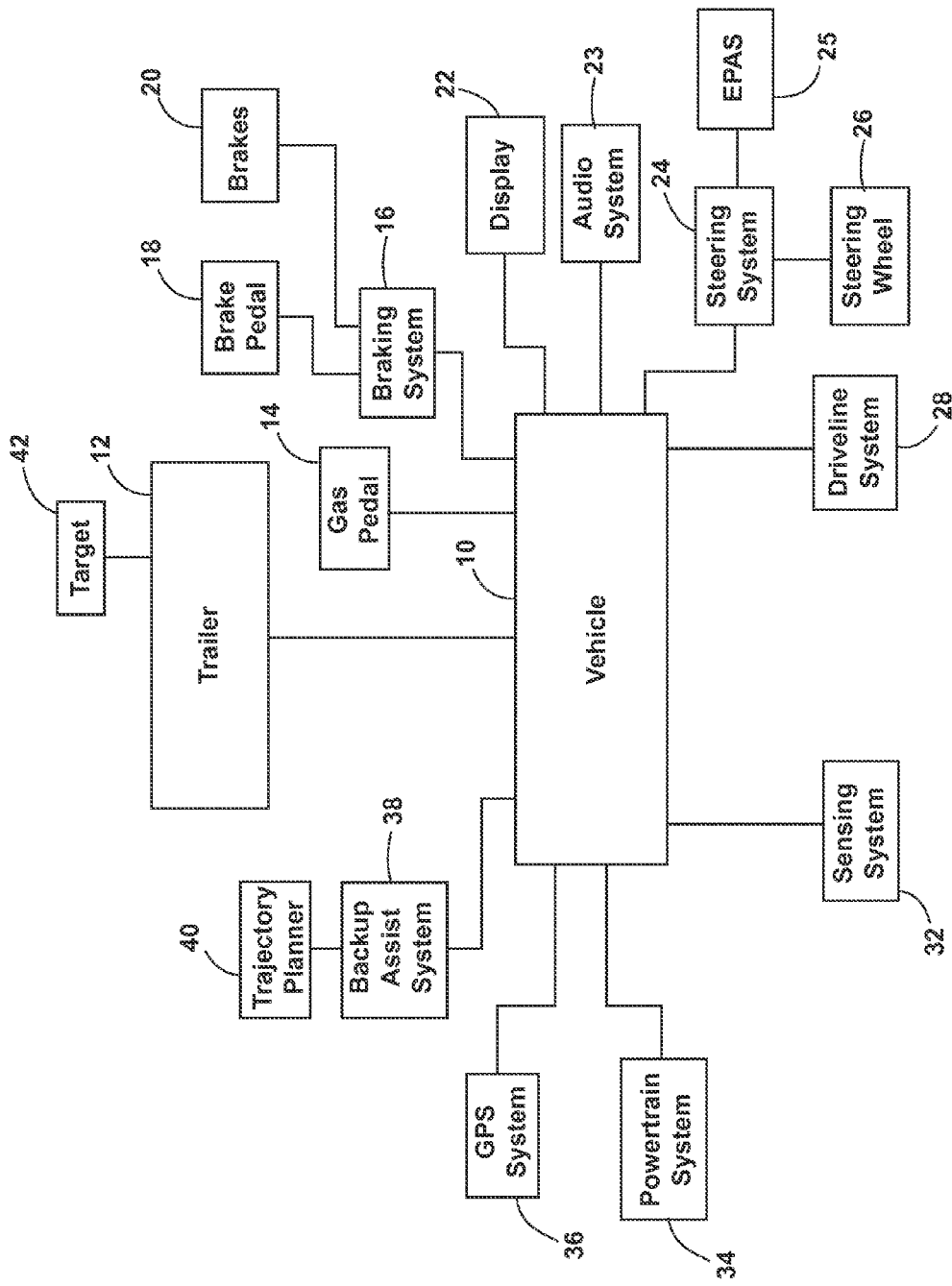
FIG. 1 illustrates a schematic diagram of a vehicle and a trailer, according to one embodiment.

Referring to FIG. 1, a schematic diagram of a vehicle 10 and trailer 12 is shown according to one embodiment. The vehicle 10 may be any vehicle with towing capabilities and includes at least the following equipment or systems: a gas pedal 14, a braking system 16 having a brake pedal 18 and brakes 20, a display 22, an audio system 23, a steering system 24 having an electric power assisted steering (EPAS) system 25 and a steering wheel 26, a driveline system 28, a sensing system 32, a powertrain system 34, a GPS system 36, and a backup assist system 38 having a trajectory planner 40. The trailer 12 may be any type of trailer and may include a target 42 disposed thereon that is monitored by the sensing system 32. Additionally, the vehicle 10 and trailer 12 described herein may include other suitable equipment or systems in lieu of those described above.

Figure 2:
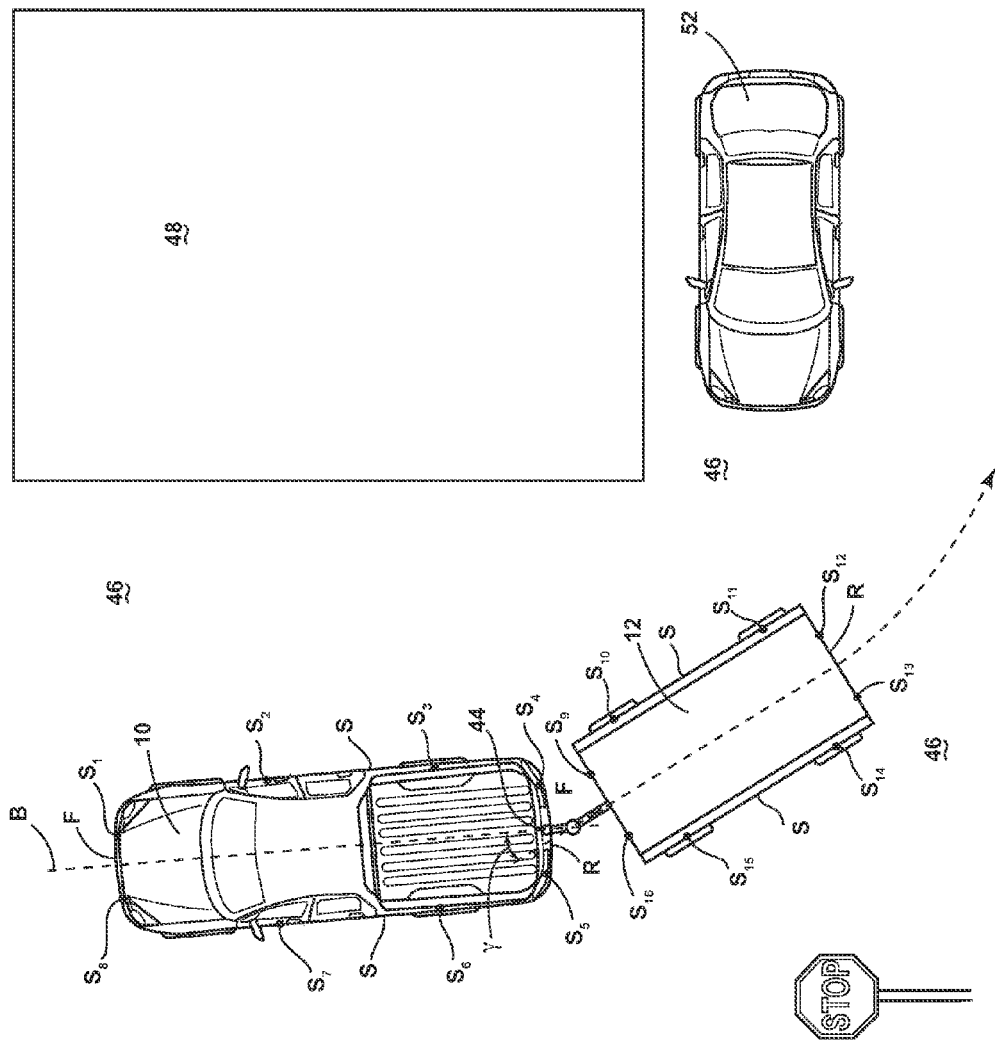
FIG. 2 illustrates a vehicle and trailer being backed along a backing path, according to one embodiment.

Referring to FIG. 2, a schematic diagram is shown of the vehicle 10 and trailer 12 backing along a backing path P according to one embodiment. In the illustrated embodiment, the sensing system 32 includes ultrasonic sensors S1-S8 disposed variously on a front F, side S, and rear R portion of the vehicle 10. Ultrasonic sensors S9-16 may also be disposed variously on a front F, side S, and rear R portion of the trailer 12. The sensing system 32 may include one or more cameras disposed on the vehicle 10 and/or trailer 12. As shown, a rear vehicle mounted camera 44 may be provided to monitor the position of the target 42 so that a hitch angle λ can be determined between the vehicle 10 and the trailer 12. It should be appreciated, however, that the number and/or location of the ultrasonic sensors S1-S16 may be other than illustrated, if so desired. Additionally or alternatively, the sensing system 32 may include radar, lidar, lasers, thermal sensors, or a combination thereof.

In operation, the ultrasonic sensors S1-S12 are configured to detect objects in an operating environment 46 of the vehicle 10 and trailer 12. With respect to the disclosure herein, the operating environment 46 should be seen to correspond to areas surrounding the vehicle 10 and/or trailer 12. The ultrasonic sensors S1-S14 each transmit ultrasonic waves outwardly from the vehicle 10 or trailer 12 and receive ultrasonic waves that are reflected off of neighboring objects in the operating environment 46. Based on the time in which an ultrasonic wave is transmitted and received, the location of an object relative to the current position of the vehicle 10 and/or trailer 12 can be determined. As exemplarily shown in FIG. 2, detectable objects in the operating environment 46 may include objects that are fixed such as building 48 and stop sign 50 in addition to objects that are capable of moving such as vehicle 52. In some instances, fixed objects can also be detected by accessing a location database through the GPS system 36. Furthermore, ultrasonic sensors such as S4, S5, S9, S16, or a combination thereof, may be used to detect the relative location between the vehicle 10 and trailer 12.

Depending on the location of a detected object, the backup assist system 38 may modify the speed in which the vehicle 10 and trailer 12 are travelling. For example, if the detected object is in close proximity to the vehicle 10 or trailer 12, the backup assist system 38 may automatically control the braking system 16 to apply brakes 20 to the vehicle 10 or otherwise limit the allowable speed of the vehicle 10. In alternative embodiments, the backup assist system 38 may instruct the driver to apply brakes (e.g., depress the brake pedal 18) to slow or stop the vehicle 10 and trailer 12. The instruction may be embodied as a text message on the display 22, an audio alert played through the audio system 23, or other suitable means.

Figure 3:
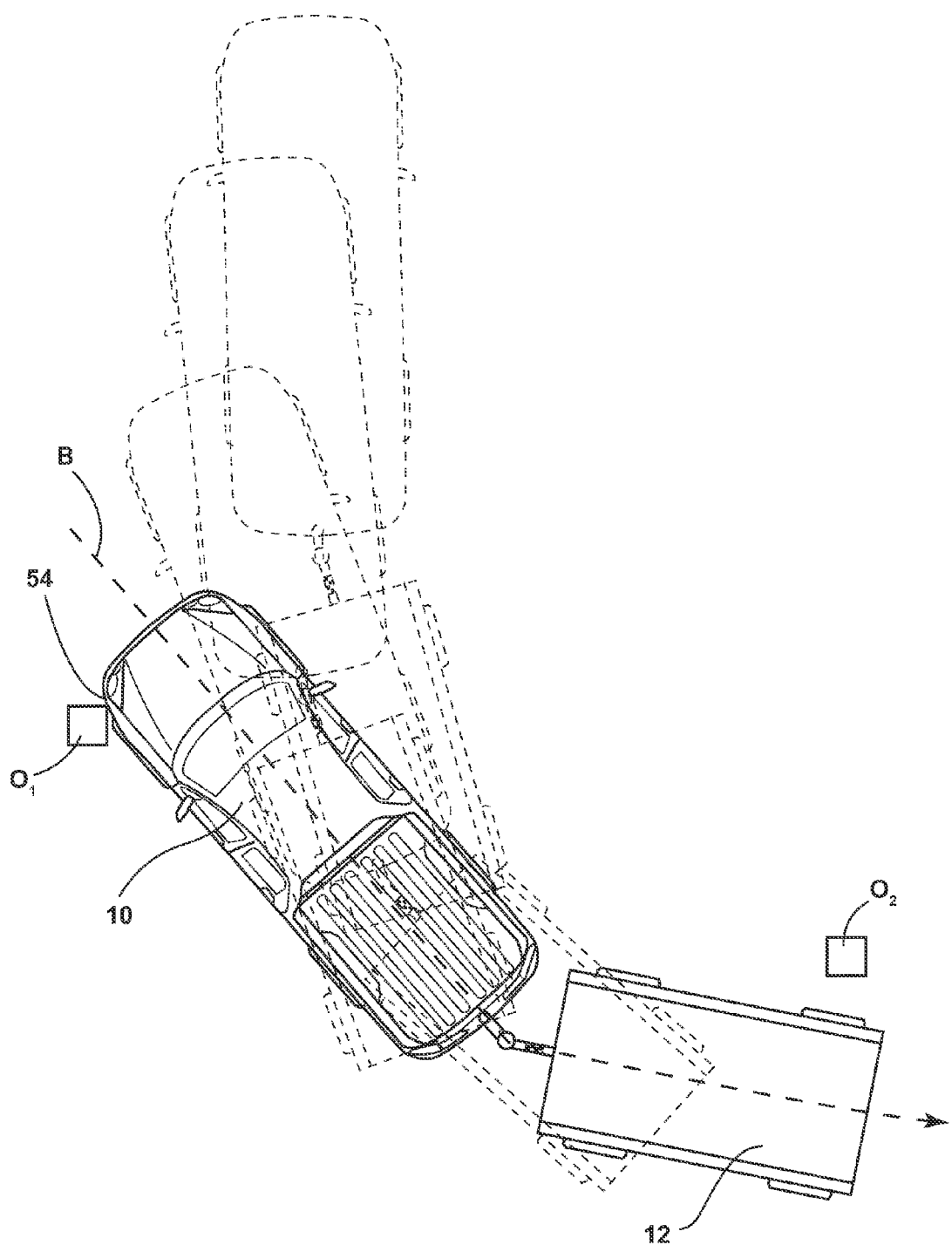
FIG. 3 illustrates a backing scenario according to one embodiment.

One backing scenario is depicted in FIG. 3, in which the vehicle 10 and trailer 12 near detected objects $O_1$ and $O_2$ while a backing maneuver is being executed along backing path P. As the vehicle and 10 and trailer 12 near the detected objects $O_1$, $O_2$, the backup assist system 38 may slowly apply the brakes 20 to reduce the speed of the vehicle 10 or execute a hard brake to quickly stop the vehicle 10 and trailer 12 in the event a collision with one or more of detected objects $O_1$, $O_2$ is imminent. For example, as the vehicle 10 and trailer 12 are backed along backing path P, a front corner 54 of the vehicle 10 may eventually collide with detected object O1 unless backward progress along the backing path P is halted. In deciding whether to slow or stop the vehicle 10 and trailer 12, the backup assist system 38 may take into account the location of the detected objects O1, O2 relative to the vehicle 10 and trailer 12 in addition to the trajectory of the vehicle 10 and trailer 12. The trajectory of the vehicle 10 and trailer 12 may be determined based on the angle of the steering wheel 26 and the hitch angle λ between the vehicle 10 and trailer 12.

Figure 4:
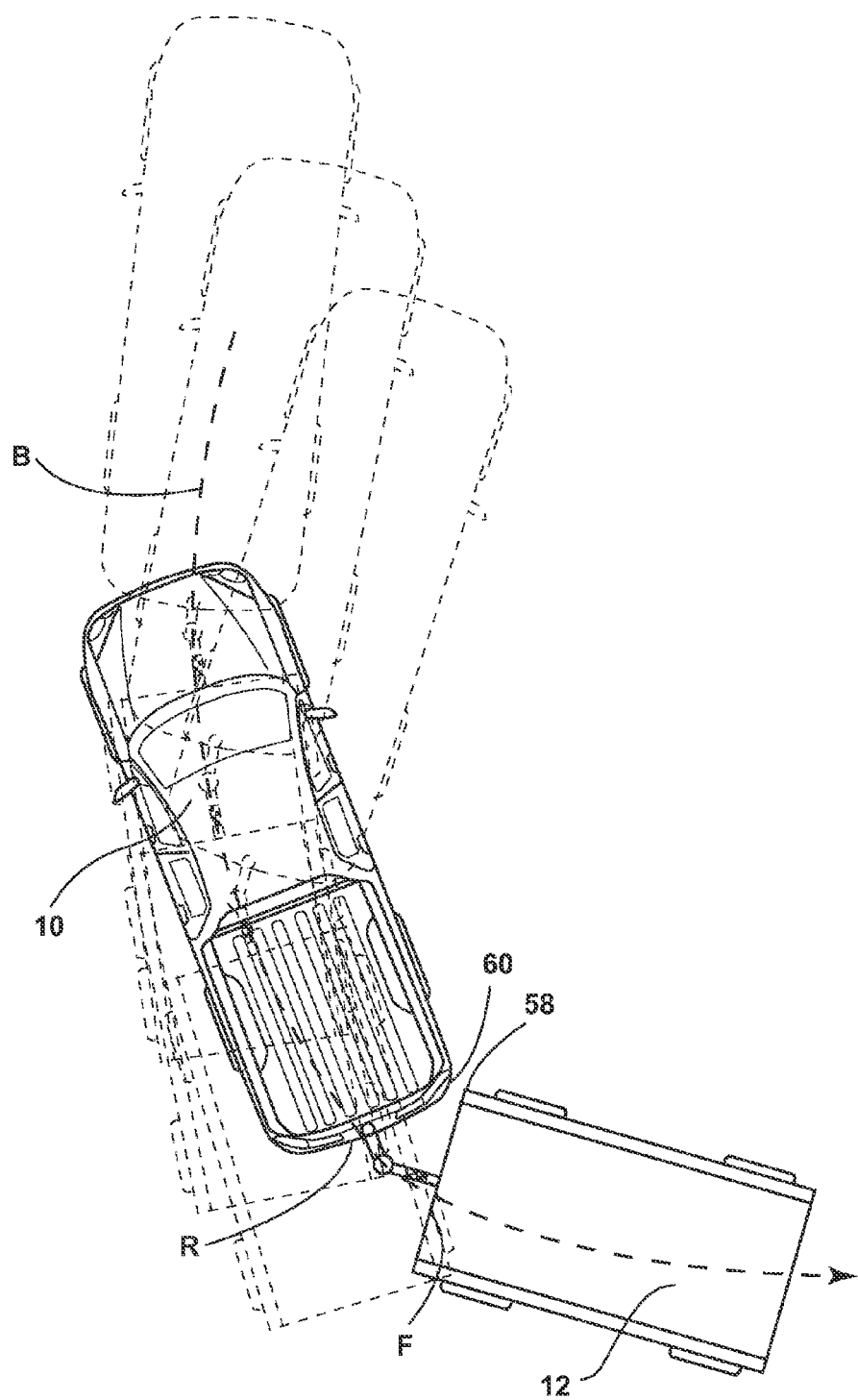
FIG. 4 illustrates a backing scenario according to another embodiment.

Another backing scenario is depicted in FIG. 4, in which the vehicle 10 and trailer 12 are executing a backing maneuver along a curved section 56 of backing path P. In such scenarios, the hitch angle λ between the vehicle 10 and trailer 12 generally increases with increased path curvature. With respect to some vehicle and trailer configurations, it becomes possible for the front F of the trailer 12 to collide with the rear R of the vehicle 10 when the hitch angle λ there between becomes sufficiently large. For example, a front corner 58 of the trailer 12 may ultimately collide with a rear corner 60 of the vehicle 10 unless backward progress along the backing path P is halted. Recognizing this, the backup assist system 38 may automatically apply the brakes 20 to reduce the speed of the vehicle 10 as the hitch angle between the vehicle 10 and trailer 12 begins to increase and may automatically execute a hard stop of the vehicle 10 should the distance between corners 58 and 60 be below a minimum allowable distance indicative of a potential collision. According to one embodiment, the minimum allowable distance between corners 58 and 60 may be determined based on the dimensions of the vehicle 10 and trailer 12 as well as the time needed in which to execute a hard stop of the vehicle 10 at the current vehicle speed. Additionally, the backup assist system 38 may determine the degree by which to reduce the speed of the vehicle 10 and trailer 12 based on hitch angle measurements received from the rear vehicle mounted camera 44.

Thus, with respect to the scenarios provided above, it is to be understood that a collision can occur between the vehicle and an object that is not the trailer 12, between the trailer 12 and an object that is not the vehicle 10, and between the vehicle 10 and the trailer 12. Furthermore, if a collision involves the vehicle 10, it should be appreciated that the vehicle 10 may sustain damage to the front F, sides S, rear R, or a combination thereof. Likewise, in trailer related collisions, the trailer may sustain damage to the front F, sides S, rear R, or a combination thereof. As described previously herein, the corners of the vehicle 10 and trailer 12 are especially susceptible to collisions with other objects or with each other while a backing maneuver is underway.

Figure 5:
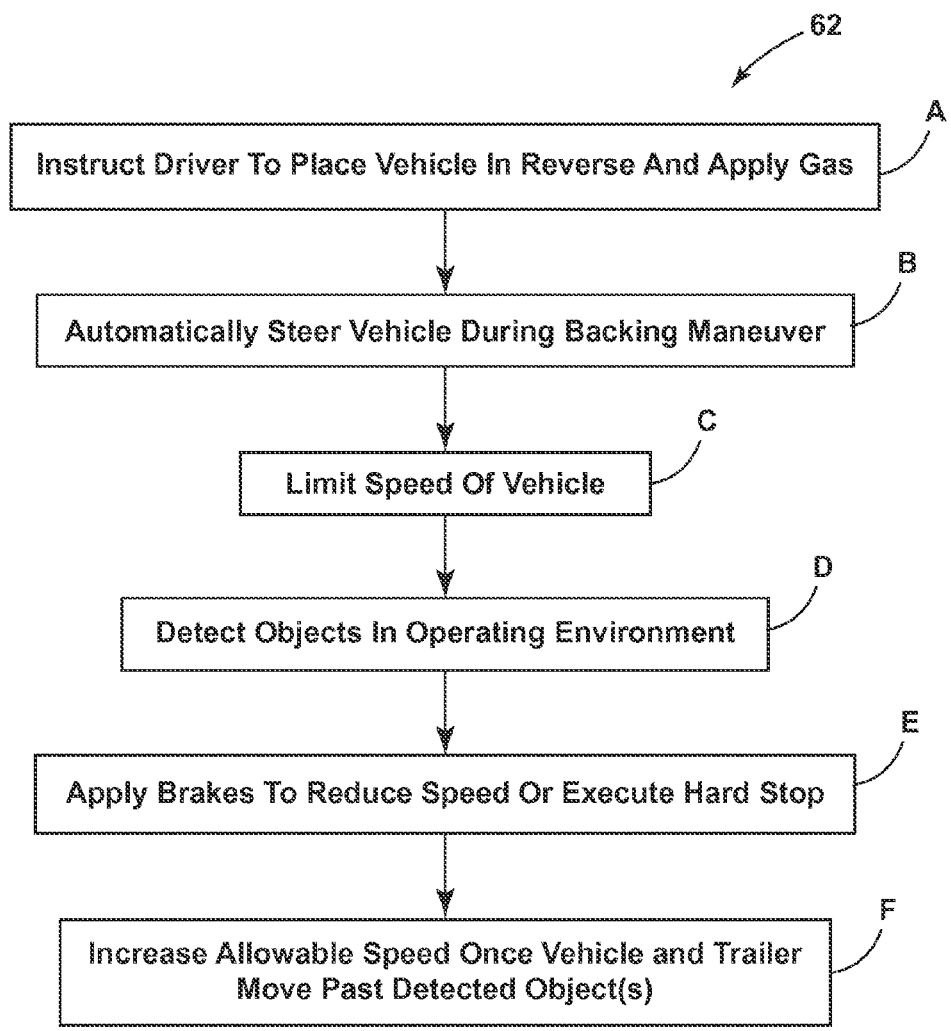
FIG. 5 illustrates a flow chart of a method for backing a vehicle and trailer, according to one embodiment.

Referring to FIG. 5, a flow chart of a method 62 for backing a vehicle and trailer is shown according to one embodiment. The method 62 is described below as being executed using the vehicle 10 and trailer 12 described previously herein with reference to FIGS. 1-4. The method 62 includes step A, where the driver is instructed to place the vehicle 10 in reverse and apply gas to the vehicle 10 (e.g., depress gas pedal 14) so that the vehicle 10 and trailer 12 can begin executing a backing maneuver along a backing path P. According to one embodiment, the backing path P may be generated by the trajectory planner 40 of the backup assist system 38 based on information received from the sensing system 32, the GPS system 36, and or user inputted waypoints.

Additional information for generating a backing path can be found in U.S. Patent Publication No. 2014/0303849 A1 to Hafner et al., entitled "TRAILER BACKUP ASSIST SYSTEM WITH TRAJECTORY PLANNER FOR MULTIPLE WAYPOINTS," filed Apr. 21, 2014; and U.S. Patent Publication 2014/0358424 to Lavoie et al., entitled "SYSTEM AND METHOD OF INPUTTING AN INTENDED BACKING PATH," filed on Aug. 14, 2014, both of which are incorporated herein by reference in their entirety.

While the vehicle 10 and trailer 12 are executing the backing maneuver, the backup assist system 38 may automatically steer the vehicle 10 at step B to guide the vehicle 10 and trailer 12 along the backing path P. Alternatively, the driver may elect to manually steer the vehicle 10 using the steering wheel 26 or other device. Additionally, at step C, the backup assist system 38 may limit the speed of the vehicle 10 by controlling the output of the driveline system 28 thereby ensuring that the vehicle 10 and trailer 12 are backed at manageable speeds. As the vehicle 10 and trailer 12 execute the backing maneuver, the sensing system 32 detects for objects in the operating environment 46 at step D. If a detected object is in close proximity to the vehicle 10 or trailer 12, the backup assist system 38 may apply the brakes 20 to either reduce the speed of the vehicle 10 and trailer 12 or execute a hard stop at step E. Alternatively, the backup assist system 38 may instruct the driver of the vehicle 10 to do the same. If a hard stop is executed, the driver may be required to reposition the vehicle 10 and trailer 12 in order to resume course along the backing path P. For example, the driver may be required to pull the vehicle 10 and trailer 12 forward some distance before returning to the backing maneuver. Once the vehicle 10 and trailer 12 move past the detected object(s), the backup assist system 38 may increase the allowable speed of the vehicle 10 and trailer 12 at step F. Thereafter, any of the steps described above may be repeated as often as necessary until the vehicle 10 and trailer 12 arrive at a final destination.

Accordingly, a system and method for backing a vehicle and trailer have been advantageously provided herein. Vehicles and trailers equipped with the features described herein are not only capable of executing semi-autonomous backing maneuvers, but are also capable of automatically controlling the speed of the vehicle 10 and trailer 12 to avoid collisions with other objects or each other. As a result, the process of executing a backing maneuver is greatly simplified for the driver.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A system for backing a vehicle and a trailer, comprising:
    ultrasonic sensors configured to detect a relative positioning between the vehicle and the trailer; and
    a backup assist system configured to receive information from the ultrasonic sensors and automatically modify a speed of the vehicle to prevent the vehicle from colliding with the trailer during a backing maneuver based on a distance between a corner of the vehicle and the trailer being below a minimum allowable distance.

2. The system of claim 1, wherein the ultrasonic sensors are each disposed on the vehicle or the trailer.

3. The system of claim 1, wherein the backup assist system communicates with a braking system of the vehicle to apply brakes to the vehicle to reduce vehicle speed as the distance between the corner of the vehicle and the trailer decreases.

4. The system of claim 3, wherein the backup assist system communicates with a braking system of the vehicle to execute a hard stop of the vehicle if the distance between the corner of the vehicle and the trailer is indicative of a potential collision between the vehicle and the trailer.

5. The system of claim 1, wherein the backup assist system is further configured to automatically steer the vehicle during the backing maneuver.

6. The system of claim 1, wherein the minimum allowable distance is determined based on dimensions of the vehicle and the trailer and a time needed in which to execute the hard stop of the vehicle.

7. A system for backing a vehicle and a trailer, comprising:
    a sensing system configured to detect a relative positioning between the vehicle and the trailer; and
    a backup assist system configured to communicate with the sensing system and automatically control a braking system of the vehicle to execute a hard stop during a backing maneuver based on a distance between a corner of the vehicle and the trailer being below a minimum allowable distance.

8. The system of claim 7, wherein the sensing system comprises ultrasonic sensors, each disposed on a front, side, or rear portion of the vehicle or the trailer.

9. The system of claim 7, wherein the backup assist system is configured to automatically slow the vehicle when the distance between the corner of the vehicle and the trailer approaches the minimum allowable distance.

10. The system of claim 7, wherein the minimum allowable distance is indicative of a potential collision between the vehicle and the trailer.

11. A method for backing a vehicle and trailer, comprising the steps of:
    executing a backing maneuver of the vehicle and trailer;
    detecting a relative positioning between the vehicle and trailer; and
    automatically controlling a braking system of the vehicle to modify a speed of the vehicle during the backing maneuver based on a distance between a corner of the vehicle and the trailer.

12. The method of claim 11, wherein the step of executing a backing maneuver comprises automatically steering the vehicle.

13. The method of claim 12, wherein the step of automatically controlling a braking system further comprises executing a hard stop if the distance between the corner of the vehicle and the trailer falls below the minimum allowable distance.

14. The method of claim 13, wherein the minimum allowable distance is determined based on dimensions of the vehicle and the trailer and a time needed in which to execute the hard stop of the vehicle.

15. The method of claim 11, wherein the step of automatically controlling a braking system comprises slowing the vehicle when the distance between the corner of the vehicle and the trailer approaches a minimum allowable distance.

* * * * *